United States Patent
Pedersen et al.

(10) Patent No.: US 8,200,285 B2
(45) Date of Patent: Jun. 12, 2012

(54) INITIAL ENODE-B CONFIGURATION OVER-THE-AIR

(75) Inventors: Klaus Pedersen, Aalborg (DK); Frank Frederiksen, Klarup (DK); Vinh Van Phan, Oulu (FI); Bernhard Raff, Neuried (DE)

(73) Assignee: Nokia Siemens Network Oy, Espoo (FI)

( * ) Notice: Subject to any disclaimer, the term of this patent is extended or adjusted under 35 U.S.C. 154(b) by 464 days.

(21) Appl. No.: 12/453,170

(22) Filed: Apr. 30, 2009

(65) Prior Publication Data

US 2009/0275323 A1  Nov. 5, 2009

Related U.S. Application Data

(60) Provisional application No. 61/071,476, filed on Apr. 30, 2008.

(51) Int. Cl.
H04B 1/38 (2006.01)

(52) U.S. Cl. .................. 455/561; 455/550.1; 455/11.1; 370/315

(58) Field of Classification Search .............. 455/561, 455/550.1, 11.1; 370/315
See application file for complete search history.

(56) References Cited

U.S. PATENT DOCUMENTS

| | | | |
|---|---|---|---|
| 5,826,197 A * | 10/1998 | Nagata et al. | 455/524 |
| 6,132,306 A * | 10/2000 | Trompower | 455/11.1 |
| 6,683,881 B1 * | 1/2004 | Mijares et al. | 370/401 |
| 7,519,029 B2 * | 4/2009 | Takeda et al. | 370/335 |
| 7,962,095 B2 * | 6/2011 | Periyalwar et al. | 455/22 |
| 2008/0151809 A1 * | 6/2008 | Chindapol et al. | 370/315 |

OTHER PUBLICATIONS

3GPP TS 36.211 V8.2.0, "3rd Generation Partnership Project; Technical Specification Group Radio Access Network; Evolved Universal Terrestrial Radio Access (E-UTRA); Physical Channels and Modulation (Release 8)" pp. 1-71, Mar. 2008.
3GPP TSG RAN #39, "Proposed SID on LTE-Advanced", NTT DoCoMo, pp. 1-5, Mar. 4-7, 2008.
International Telecommunication Union, Circular letter 5/LCCE/2, pp. 1-7, Mar. 7, 2008.
International Telecommunication Union, Addendum 1 to Circular Letter 5/LCCE/2, pp. 1-2, Aug. 13, 2008.
International Telecommunication Union, Addendum 2 to Circular Letter 5/LCCE/2, pp. 1-2, Dec. 18, 2008.

* cited by examiner

Primary Examiner — Danh Le
(74) Attorney, Agent, or Firm — Squire Sanders (US) LLP

(57) ABSTRACT

A method, apparatus, system, and computer program embodied on a computer readable medium is provided to define new messages to be transmitted over a broadcast channel to better support uncoordinated base station deployment in a local area environment. In this context, uncoordinated local base station deployment refers to cases where new base stations are placed, and activated, without any detailed a priori network planning and considerations for placement of already active base stations in the area.

21 Claims, 7 Drawing Sheets

INITIAL ENODE-B CONFIGURATION OVER-THE-AIR

CROSS REFERENCE TO RELATED APPLICATIONS

This application claims priority under 35 U.S.C. §119(e) of U.S. Provisional Patent Application Ser. No. 61/071,476, filed on Apr. 30, 2008. The subject matter of the earlier filed application is hereby incorporated by reference.

BACKGROUND

1. Field

The present invention relates generally to communication systems, and particularly to wireless communication systems, such as Third Generation Mobile System ("3GPP"). More specifically, the present invention relates to apparatus, systems, and methods for uncoordinated base station deployment in communication systems.

2. Description of the Related Art

Universal Mobile Telecommunication System (UMTS) Terrestrial Radio Access Network (UTRAN) refers to a communications network including base stations, or Node-Bs, and radio network controllers (RNC). UTRAN allows for connectivity between the user equipment (UE) and the core network. A Node-B is the equipment which facilitates the wireless communication between UEs and the network. Once a Node-B is installed and activated, its network parameters must be configured so that the Node-B is aware of the network that it belongs to, is aware of other network elements of its network, such as other Node-Bs and UEs, and can communicate with the other network elements of its network.

3GPP Long Term Evolution (LTE) refers to improvements of the UMTS through improved efficiency and services, lower costs, and use of new spectrum opportunities. In discussion of the LTE standard, a Node-B is referred to as an enhanced Node-B ("eNode-B").

SUMMARY

Embodiments of the invention can provide a method which includes creating a message, at a first base station, including network configuration information. The method further includes broadcasting the message over a broadcast channel to a second base station. The second base station is configured to use the network configuration information to configure network parameters of the second base station.

Furthermore, embodiments of the invention can provide a method, which includes listening over a broadcast channel for a first message from a first base station, at a second base station, the first message including network configuration information, and receiving the first message over the broadcast channel from the first base station. The method further includes configuring network parameters of the second base station based upon the received network configuration information, and broadcasting a second message over the broadcast channel to a third base station operating on a same frequency as the second base station, the second message including the configured network parameters.

Furthermore, embodiments of the invention can provide a computer program, embodied on a computer readable medium, configured to control a processor to implement a method. The method includes creating a message, at a first base station, including network configuration information, and broadcasting the message over a broadcast channel to a second base station. The second base station is configured to use the network configuration information to configure network parameters of the second base station.

Furthermore, embodiments of the invention can provide a computer program, embodied on a computer readable medium, configured to control a processor to implement a method. The method includes listening over a broadcast channel for a first message from a first base station, at a second base station, the first message including network configuration information, and receiving the first message over the broadcast channel from the first base station. The method further includes configuring network parameters of the second base station based upon the received network configuration information, and broadcasting a second message over the broadcast channel to a third base station operating on a same frequency as the second base station, the second message including the configured network parameters.

Furthermore, embodiments of the invention can provide an apparatus, which includes a processor configured to create a message including network configuration information, and a transmitter configured to broadcast the message over a broadcast channel to a base station. The base station is configured to use the network configuration information to configure network parameters of the base station.

Furthermore, embodiments of the invention can provide an apparatus, which includes a listener configured to listen over a broadcast channel for a first message from a first base station, the first message including network configuration information, and a receiver configured to receive the first message over the broadcast channel from the first base station. The apparatus further includes a controller configured to configure network parameters of a second base station based upon the received network configuration information, and a transmitter configured to broadcast a second message over the broadcast channel to a third base station operating on a same frequency as the second base station, the second message including the configured network parameters.

Furthermore, embodiments of the invention can provide an apparatus, which includes means for creating a message including network configuration information, and means for broadcasting the message over a broadcast channel to a base station. The base station is configured to use the network configuration information to configure network parameters of the base station.

Furthermore, embodiments of the invention can provide an apparatus, which includes means for listening over a broadcast channel for a first message from a first base station, the first message including network configuration information, and means for receiving the first message over the broadcast channel from the first base station. The apparatus further includes means for configuring network parameters of a second base station based upon the received network configuration information, and means for broadcasting a second message over the broadcast channel to a third base station operating on a same frequency as the second base station, the second message including the configured network parameters.

Furthermore, embodiments of the invention can provide a system, which includes a first base station, including a processor configured to create a first message which includes network configuration information, and a transmitter configured to broadcast the first message over a broadcast channel to a second base station. The system further includes a second base station, including a listener configured to listen over a broadcast channel for the first message from the first base station, and a receiver configured to receive receiving the first message over the broadcast channel from the first base station. The second base station further includes a controller configured to configure network parameters of the second base station based upon the received network configuration information, and a transmitter configured to broadcast a second message over the broadcast channel to a third base station operating on a same frequency as the second base station, the second message including the configured network parameters.

BRIEF DESCRIPTION OF THE DRAWINGS

Further embodiments, details, advantages, and modifications of the present invention, will become apparent from the following detailed description of the preferred embodiments, which is to be taken in conjunction with the accompanying drawings, wherein.

DETAILED DESCRIPTION

It will be readily understood that the components of the present invention, as generally described and illustrated in the figures herein, may be arranged and designed in a wide variety of different configurations. Thus, the following more detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage to "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

In addition, while the term "message" has been used in the description of the present invention, the invention may be applied to many types of network data, such as packet, frame, datagram, etc. For purposes of this invention, the term message also includes packet, frame, datagram, and any equivalents thereof.

As standardization of Release 8 ("Rel'8") of 3GPP LTE is coming to an end, there are currently a lot of activities related to definition of study items for Release 9 ("Rel'9") of 3GPP LTE, as discussed in 3GPP TSG RAN #39, RP-080137. One likely candidate for Rel'9 of 3GPP LTE is a local area solution with enhanced support for uncoordinated eNode-B (or home eNode-B) deployment and bandwidths larger than 20 MHz (potentially up to 100 MHz as discussed for International Mobile Telecommunication—Advanced requirements).

Figure 1:
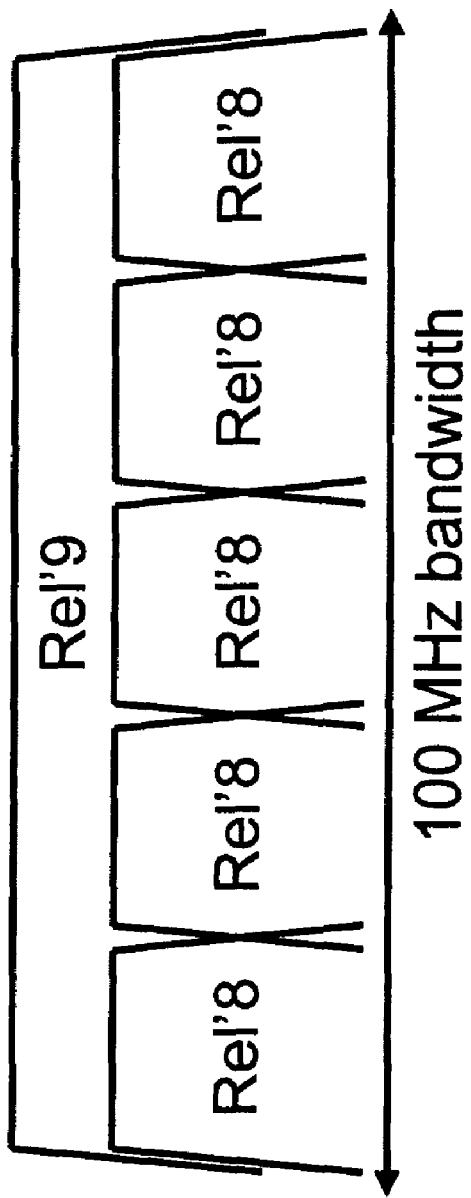
FIG. 1 illustrates a frequency domain representation of a possible backward compatible LTE Rel'9 solution with up to 100 MHz system bandwidth, where the full Rel'9 system bandwidth is a bonding of several Rel'8 bands.

Assuming requirements for backward compatibility between Rel'8 and Rel'9, the so-called "channel bonding solution" as pictured in FIG. 1 is a promising candidate for Rel'9 of 3GPP LTE. FIG. 1 shows the frequency domain characteristics, where the user equipments ("UEs") can be served over the full 100 MHz bandwidth, while UEs of Rel'8 can only be served under one of the Rel'8 bands (each with a maximum bandwidth of 20 MHz). As agreed for Rel'8 of 3GPP LTE, a broadcast channel (BCH) is periodically transmitted in the downlink (from each eNode-B), in the center part of each Rel'8 band. As one of ordinary skill in the art would readily understand, a BCH is a downlink transport channel that is used to broadcast system- and cell-specific information in a message format. The BCH provides signaling information, so that the UEs in a particular cell can locate, synchronize, and access the network. The BCH is described in greater detail, including how often, and at which symbols in the time-frequency domain, the signaling information is transmitted, at 3GPP Specification 36.211 Version 8.2.0.

In the context of 3GPP LTE, uncoordinated local eNode-B deployment refers to cases where new eNode-Bs are placed, and activated, in an existing 3GPP network, without any detailed a priori network planning and consideration for the placement of eNode-Bs which are already active in the area.

One of the problems related to uncoordinated eNode-B deployment is initial configuration of parameters such as scrambling code assignment, identification of neighboring eNode-Bs, etc. 3GPP LTE Rel'8 does not provide for over-the-air information exchange between eNode-Bs for the purpose of initial configuration of network parameters of newly activated eNode-Bs. Instead, this configuration is typically assumed to be part of the radio network planning and configuration phase. In other words, it is typically assumed that this configuration must occur at the site of the eNode-B, and before the eNode-B is activated.

Figure 2:
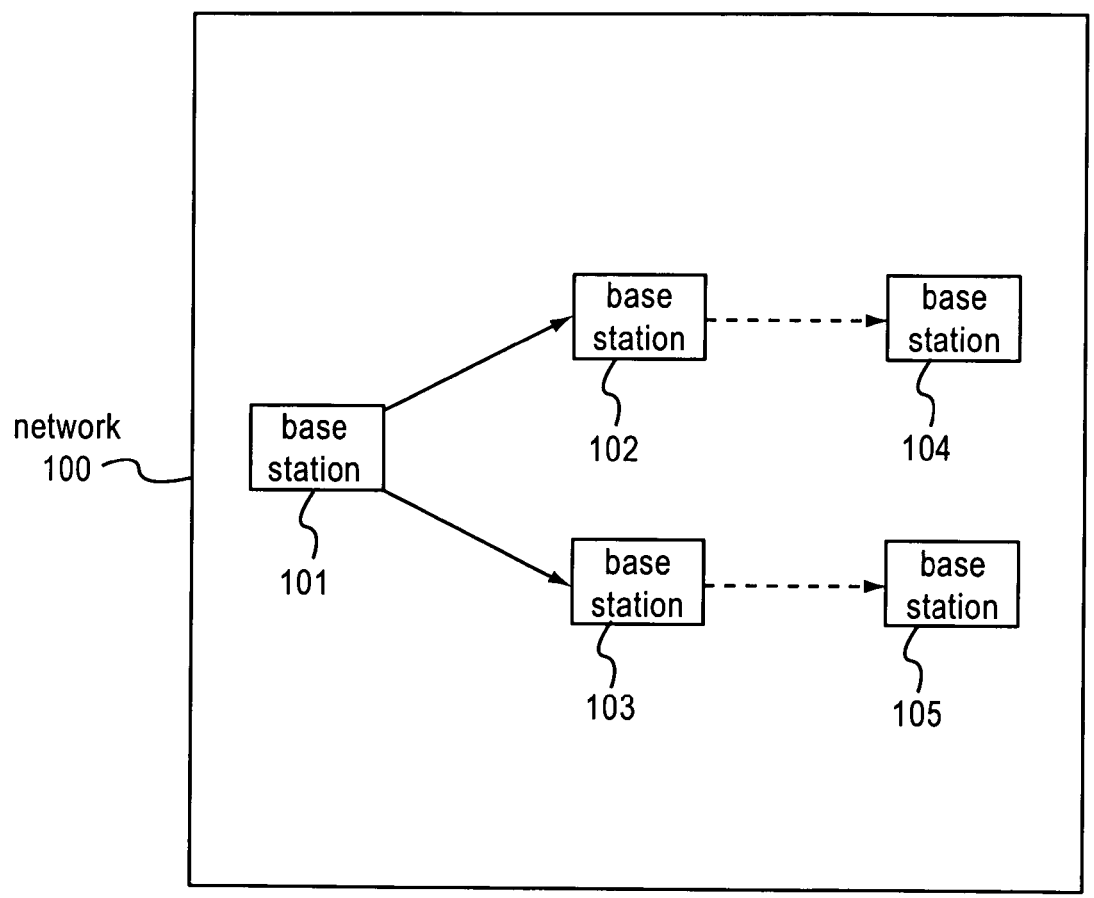
FIG. 2 illustrates an example embodiment of a communication system according to the present invention.

FIG. 2 illustrates an example embodiment of a communication system according to the present invention. The depicted system includes a network 100, an existing eNode-B 101, newly activated eNode-Bs 102 and 103, and existing eNode-Bs 104 and 105. In the illustrated embodiment, eNode-B 102 operates on the same frequency as eNode-B 104, and eNode-B 103 operates on the same frequency as eNode-B 105. Furthermore, in the illustrated embodiment, newly activated eNode-Bs 102 and 103 can be Rel'9 eNode-Bs. The eNode-Bs can communicate with each other over a Rel'8 BCH. While FIG. 2 includes arrows which illustrate, according to embodiments of the invention, that the eNode-B 101 is capable of communicating with eNode-B 102 and 103, that eNode-B 102 is capable of communication with eNode-B 104, and that eNode-B 103 is capable of communicating with eNode-B 105, one of ordinary skill in the art would readily understand that each of the eNode-Bs are capable of communicating with any and all of the other eNode-Bs within the network 100.

One of ordinary skill in the art would readily understand that the network 100 is capable of having any number of eNode-Bs within the network. Accordingly, one of ordinary skill in the art would readily understand that the system as depicted in FIG. 2 is an example embodiment of a communication system according to the present invention, and does not limit the scope of the present invention to a particular number of eNode-Bs.

Figure 3:
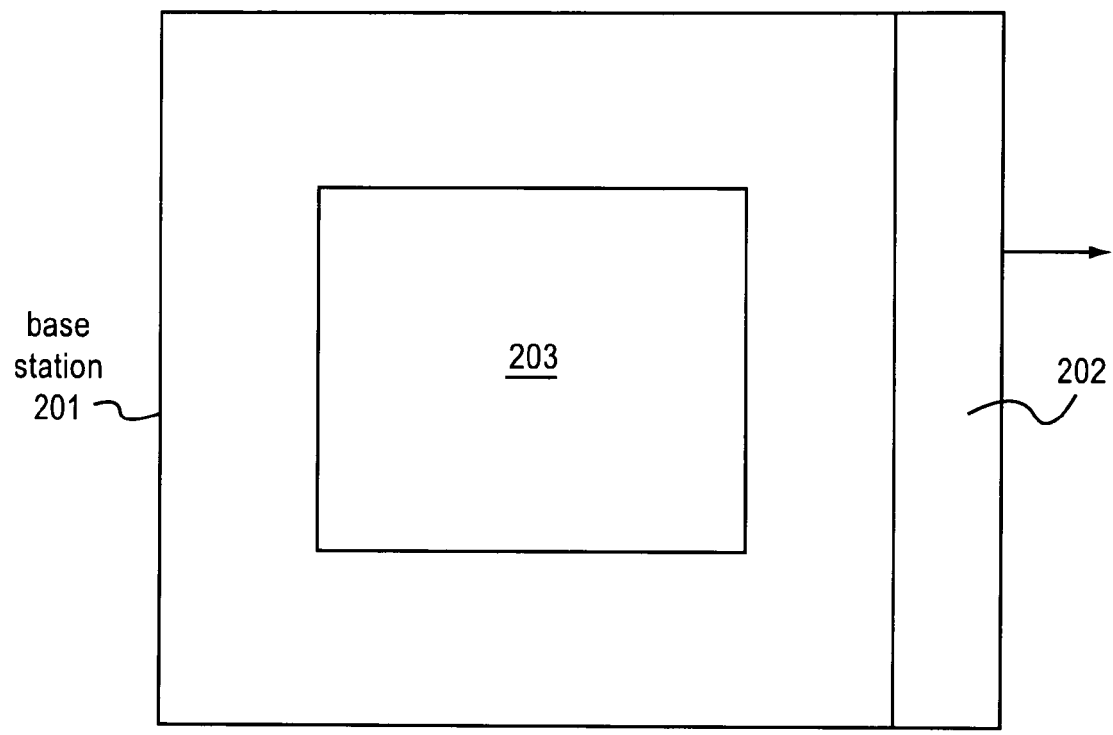
FIG. 3 illustrates an example embodiment of a base station according to the present invention.

FIG. 3 is a block diagram of an eNode-B 201, in accordance with one embodiment of the present invention. The depicted eNode-B 201 includes a transmitter 202, and a processor 203. In certain embodiments, the eNode-B 201 corresponds to the existing eNode-B 101 of FIG. 2. The components of the eNode-B 201 cooperate to define a message which includes network configuration information and to transmit the message over a BCH to newly activated eNode-Bs of the network.

In certain embodiments, the processor 203 of the eNode-B 201 is configured to create a new message which includes network configuration information. The network configuration information is inserted into a message that is to be broadcasted to other eNode-Bs over a BCH. The network configuration information can be used by an eNode-B for rapid configuration of its network parameters, once the eNode-B has been activated within the network. In some embodiments, the network configuration information can include network configuration parameters, such as the identification of which cell the neighboring eNode-B is located, the Internet Protocol (IP) addresses of eNode-Bs which already exist on the network, or a scrambling code assignment. In some embodiments, the new message is a 3GPP LTE Rel'9 message capable of being transmitted over a BCH of an eNode-B.

In certain embodiments, the transmitter 202 of the eNode-B 201 is configured to broadcast the new message which includes network configuration information over the BCH to all new eNode-Bs (not shown) which have recently been activated, but have not yet been configured. In certain embodiments, the transmitter 202 is configured to broadcast the new message over a 3GPP LTE Rel'8 BCH. Due to the backwards capability of Rel'9 and Rel'8, as discussed above, the transmitter 202 may be capable of transmitting a Rel'9 message over a Rel'8 BCH.

In certain embodiments, the transmitter 202 can be configured to periodically broadcast the new message over the BCH to any newly activated eNode-Bs, over a predetermined interval. This can provide a framework for constant automatic configuration of eNode-Bs, as new eNode-Bs, which are activated, can receive the new message and use the received network configuration information to configure its network parameters as the new eNode-Bs enter the network.

Figure 4:
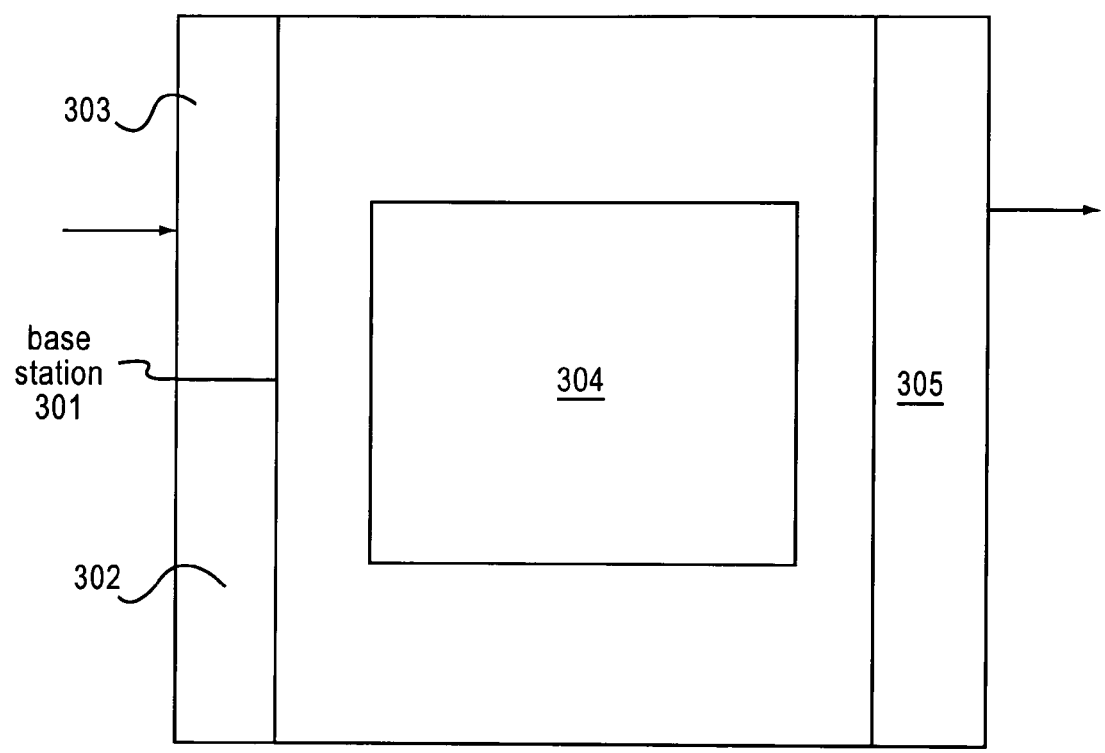
FIG. 4 illustrates another example embodiment of a base station according to the present invention.

FIG. 4 is a block diagram of an eNode-B 301, in accordance with another embodiment of the present invention. The depicted eNode-B 301 includes a listener 202, a receiver 303, a controller 304, and a transmitter 305. In certain embodiments, the eNode-B 301 corresponds to the newly activated eNode-Bs 102 and 103 of FIG. 2. The components of the eNode-B 301 cooperate to listen for a message which includes network configuration information over a BCH, receive the message, configure network parameters based on the received network configuration information, and to transmit the message over a BCH to eNode-Bs of the same frequency.

In certain embodiments, the listener 302 of the eNode-B 301 is configured to listen over a BCH for a message from a neighboring eNode-B (not shown), which can include network configuration information. In some embodiments, the message which the listener 302 listens for can be a 3GPP LTE Rel'9 message, while the BCH, of which the listener 302 listens over, can be a 3GPP LTE Rel'8 BCH. As discussed above, due to the backwards capability of 3GPP LTE Rel'9, the Rel'8 BCH is capable of transmitting and receiving Rel'9 messages.

Once the listener 302 detects a message from a neighboring eNode-B, in certain embodiments, the receiver 303 of the eNode-B 301 is configured to receive the message which can contain network configuration information over the BCH from the neighboring eNode-B (not shown). In some embodiments, the network configuration information can include network configuration parameters, such as the identification of which cell the neighboring eNode-B is located, the IP addresses of eNode-Bs which already exist on the network, or a scrambling code assignment.

In certain embodiments, once the receiver 303 has received the network configuration information, the controller 304 of the eNode-B 301 is configured to configure network parameters of the eNode-B 301. The configuration can be carried out by adopting recommended network parameters based on the received network configuration information from the neighboring eNode-B before starting operation, where the eNode-B 301 starts to carry user-plane traffic to new users. In other words, the controller 304 can use the received network configuration information to set the network parameters of the eNode-B 301 to appropriate settings which will allow the eNode-B 301 to operate within the network. As discussed above, in some embodiments, this network configuration information can include the identification of which cell the neighboring eNode-B is located, the IP addresses of eNode-Bs which already exist on the network, or a scrambling code assignment. Such information can allow the eNode-B 301 to effectively operate within the network.

In some embodiments, the controller 304 can configure the network configuration parameters of the eNode-B 301 by internally deriving the network configuration parameters based on a combination of the received network configuration information, and a set of unique parameters that are specific to the eNode-B 301. The set of unique parameters can include, for example, one or more media access control addresses for one or more network cards.

In some embodiments, if a message containing network configuration information is not received by the receiver 303, the controller 304 can configure the network configuration parameters of the eNode-B 301 by internally deriving the network configuration parameters based solely on a set of default parameters. In this way, the automatic network configuration is able to recover from a system failure, such as a power outage, as the newly activated eNode-B is still able to configure its network parameters despite the fact that it does not sense any neighboring eNode-Bs, and does not receive any network configuration information from the neighboring eNode-Bs.

Once the controller 304 has configured the network configuration parameters of the eNode-B 301, in certain embodiments, the transmitter 305 of the eNode-B 301 is configured to inform the existing neighboring eNode-Bs (not shown) operating in the same frequency by broadcasting a message over the BCH which can include the configured network configuration parameters. This allows the existing neighboring eNode-Bs to learn about the existence of newly activated eNode-B 301 within the network. In some embodiments, the message broadcasted by the transmitter 305 is a 3GPP LTE Rel'9 message, while the BCH, of which the transmitter 305 broadcasts over, is a 3GPP LTE Rel'8 BCH. In certain embodiments, the existing neighboring eNode-Bs operating in the same frequency correspond to the previously existing eNode-Bs 104 and 105 of FIG. 2.

Figure 5:
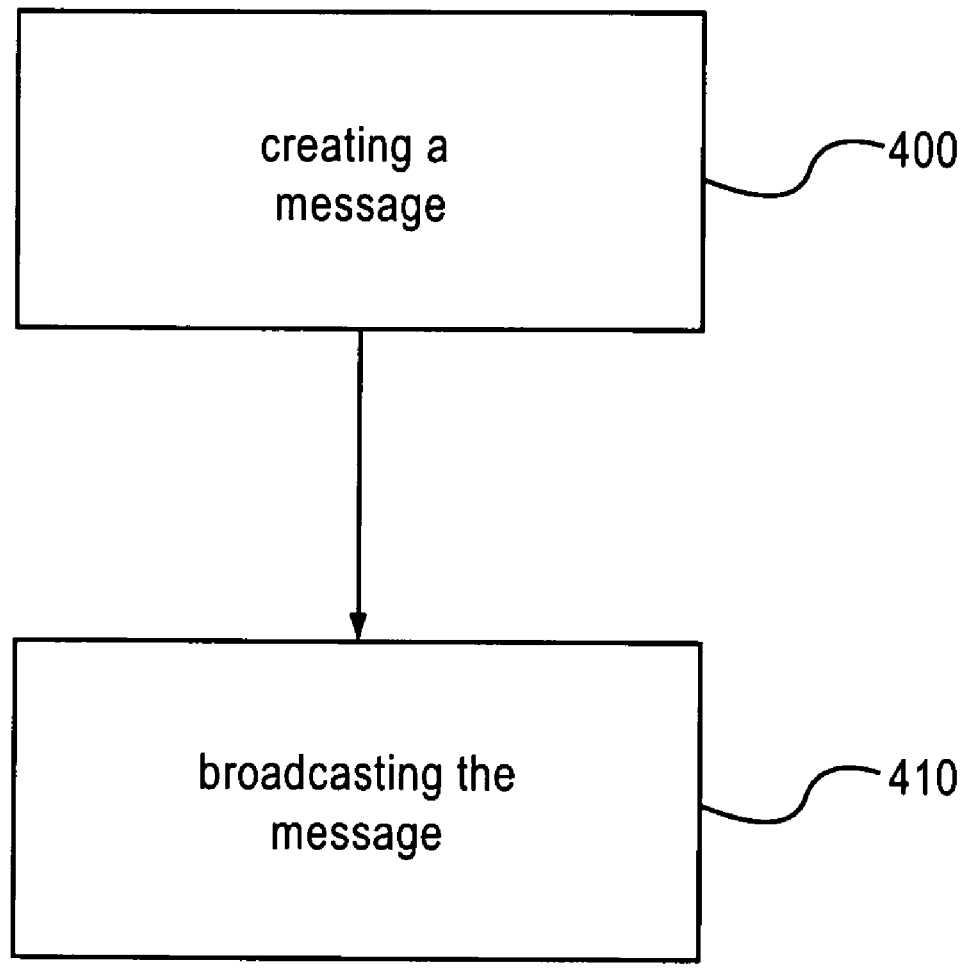
FIG. 5 illustrates a method for generating and transmitting network configuration information, in accordance with an embodiment of the present invention.

FIG. 5 is a flow chart diagram of a method for generating and transmitting network configuration information, in accordance with an embodiment of the present invention. At step 410, the method creates a message which can include network configuration information. At step 420, the method broadcasts the message over a BCH to a newly activated eNode-B. The newly activated eNode-B can use the network configuration information to configure its own network parameters.

In some embodiments, the network configuration information can include network configuration parameters, such as the identification of which cell the neighboring eNode-B is located, the IP addresses of eNode-Bs which already exist on the network, or a scrambling code assignment.

In some embodiments, the new message is a 3GPP LTE Rel'9 message capable of being transmitted over a BCH of an eNode-B. In some other embodiments, the BCH is a 3GPP LTE Rel'8 BCH. As discussed above, due to the backwards capability of 3GPP LTE Rel'9, the Rel'8 BCH is capable of transmitting and receiving Rel'9 messages.

In certain embodiments, the broadcasting of the message can include periodically broadcast the new message over the BCH to any newly activated eNode-Bs, over a predetermined interval. As discussed above, this can provide a framework for constant automatic configuration of eNode-Bs, as new eNode-Bs, which are activated, can receive the new message and use the received network configuration information to configure its network parameters as the new eNode-Bs enter the network.

One of ordinary skill in the art would readily understand that the sequence of operations described in relation to FIG. 5 may vary between embodiments of the present invention.

Figure 6:
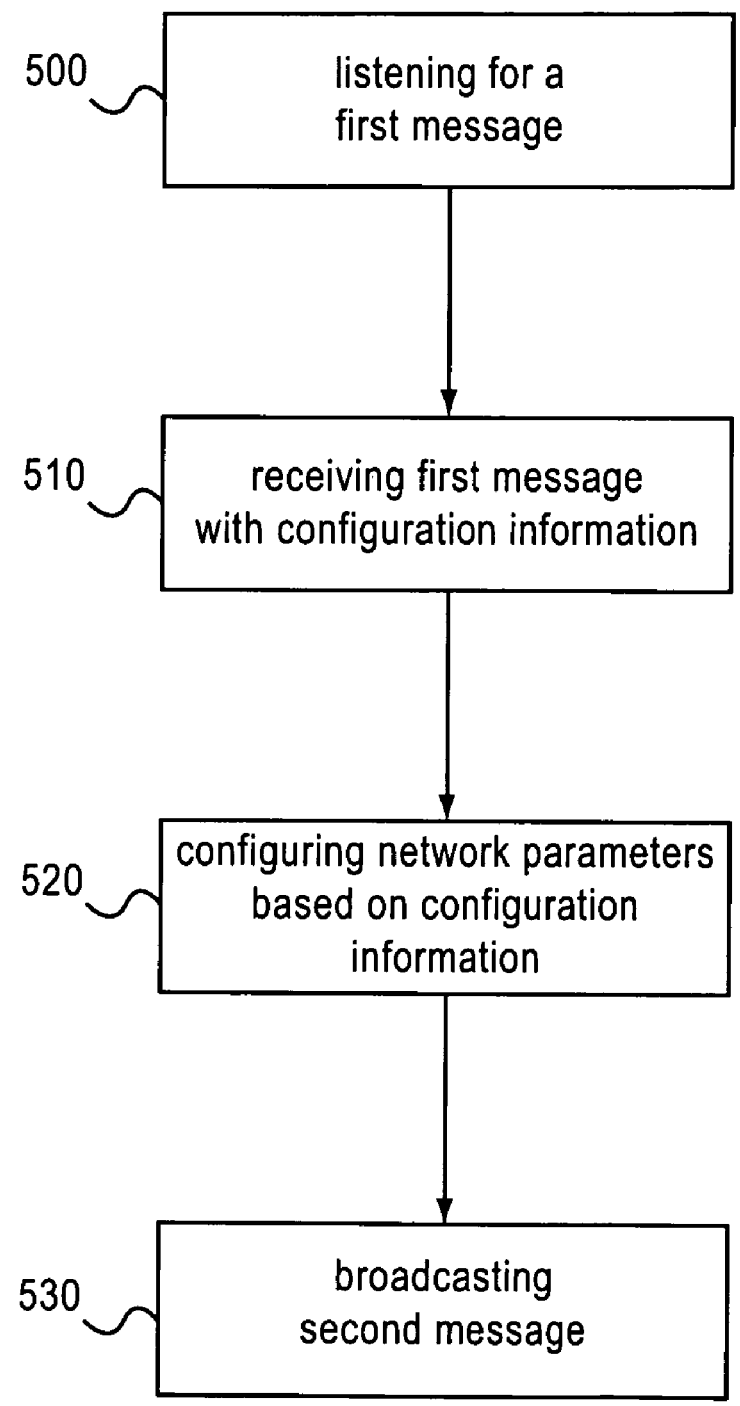
FIG. 6 illustrates a method for receiving network configuration information and configuring network parameters based on the network configuration information, in accordance with another embodiment of the present invention.

FIG. 6 is a flow chart diagram of a method for receiving network configuration information and configuring network parameters based on the network configuration information, in accordance with another embodiment of the present invention. At step 500, the method listens over a BCH for a first message which can contain network configuration information from a neighboring eNode-B. At step 510, the method receives the first message, which can include the network configuration information, over the BCH from the neighboring eNode-B. At step 520, the method configures network parameters of a newly activated eNode-B based upon the received network configuration information. The configuration can be carried out by adopting recommended network parameters based on the received network configuration information from the neighboring eNode-B. At step 530, the method broadcasts a second message, which can include the configured network parameters, over the BCH to any neighboring eNode-Bs operating on the same frequency.

In some embodiments, the first message is a 3GPP LTE Rel'9 message, while the BCH is a 3GPP LTE Rel'8 BCH. As discussed above, due to the backwards capability of 3GPP LTE Rel'9, the Rel'8 BCH is capable of transmitting and receiving Rel'9 messages.

In some embodiments, the network configuration information can include network configuration parameters, such as the identification of which cell the neighboring eNode-B is located, the IP addresses of eNode-Bs which already exist on the network, or a scrambling code assignment.

In some embodiments, the configuring of the network parameters of a newly activated eNode-B, based upon the received network configuration information, is achieved by internally deriving the network configuration parameters based on a combination of the received network configuration information, and a set of unique parameters that are specific to the newly activated eNode-B. The set of unique parameters can include, for example, one or more media access control addresses for one or more network cards.

In some embodiments, the second message broadcasted in step 530 is a 3GPP LTE Rel'9 message, while the BCH, of which the second message is broadcasted over, is a 3GPP LTE Rel'8 BCH.

Figure 7:
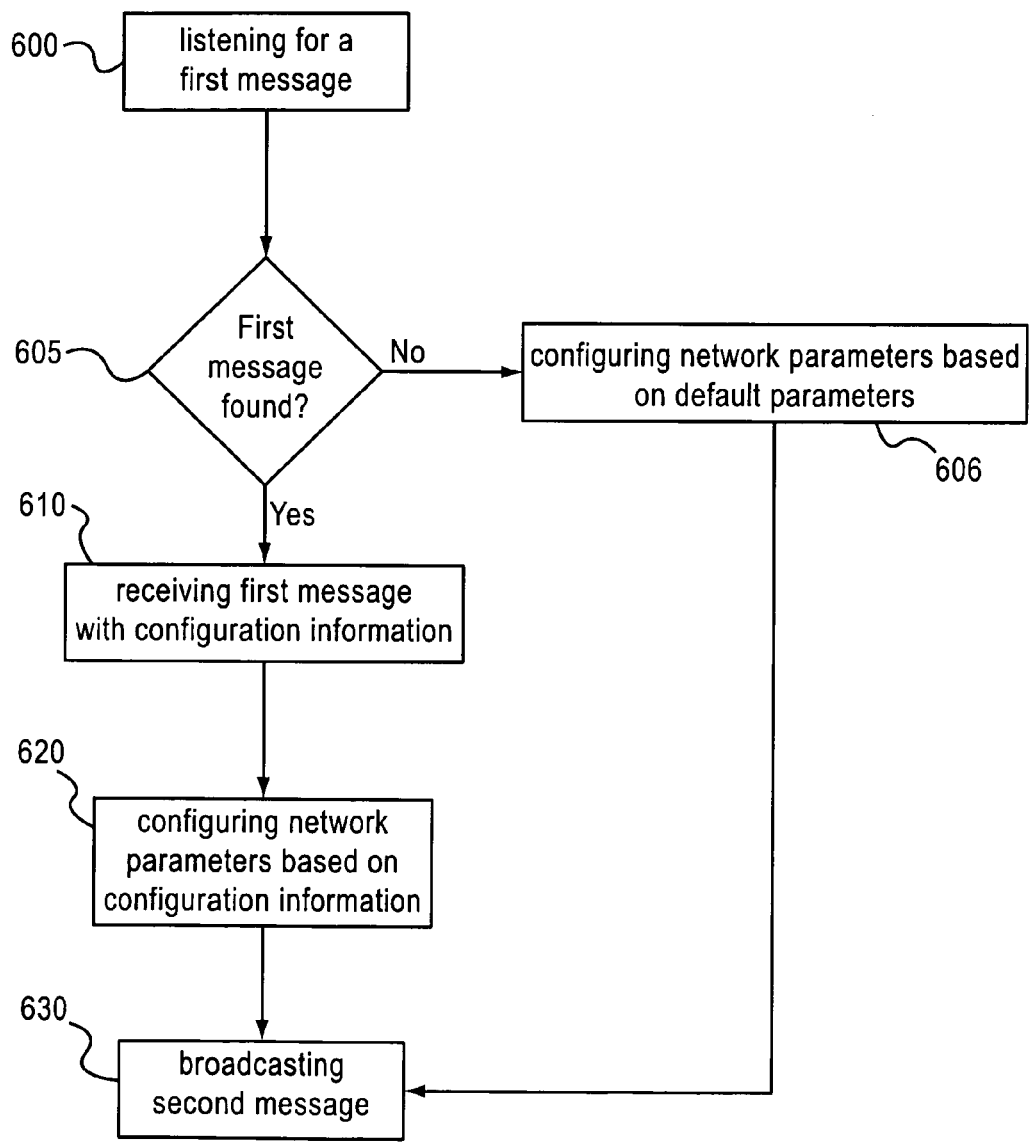
FIG. 7 illustrates another method for receiving network configuration information and configuring network parameters based on the network configuration information, in accordance with another embodiment of the present invention.

FIG. 7 is a flow chart diagram of another method for receiving network configuration information and configuring network parameters based on the network configuration information, in accordance with another embodiment of the present invention.

At step 600, the method listens over a BCH for a first message which can contain network configuration information from a neighboring eNode-B. At decision 605, it is determined whether a first message containing network configuration information is found. If a first message is found, the method moves to step 610. At step 610, the method receives the first message, which can include the network configuration information, over the BCH from the neighboring eNode-B. At step 620, the method configures network parameters of a newly activated eNode-B based upon the received network configuration information. At step 630, the method broadcasts a second message, which can include the configured network parameters, over the BCH to any neighboring eNode-Bs operating on the same frequency.

At decision 605, if a first message is not found, the method proceeds to step 606 instead of step 610. At step 606, the method configures network parameters of the newly activated eNode-B solely based upon a set of pre-defined default parameters, rather than received network configuration information from a neighboring eNode-B. The method then proceeds to step 630, where the method broadcasts the second message, as described above. In this way, the automatic network configuration is able to recover from a system failure, such as a power outage, as the newly activated eNode-B is still able to configure its network parameters despite the fact that it does not sense any neighboring eNode-Bs, and does not receive any network configuration information from the neighboring eNode-Bs.

One of ordinary skill in the art would readily understand that the sequence of operations described in relation to FIG. 6 and FIG. 7, respectively, may vary between embodiments of the present invention.

The method steps performed in FIGS. 5-7 may be performed by a computer program product embodied on a computer-readable medium, encoding instructions for performing at least the method described in FIGS. 5-7, in accordance with an embodiment of the present invention. The computer program product may be embodied on a computer readable medium, such as a storage medium. For example, a computer program product may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. The computer program product may include encoded instructions for implementing the method described in FIGS. 5-7, which may also be stored on the computer readable medium.

The computer program product can be implemented in hardware, software, or a hybrid implementation. The computer program product can be composed of modules that are in operative communication with one another, and which are designed to pass information or instructions to a communication device, such as a user equipment or a base station. The computer program product can be configured to operate on a general purpose computer, or an application specific integrated circuit (ASIC).

Thus, embodiments of the present invention offer many advantages. For example, embodiments of the invention may provide an easy method for automatic configuration of new eNode-Bs that are installed, and activated, in a preexisting network. Embodiments of the invention solely rely on over-the-air communication between the eNode-Bs, so no a priori knowledge of the backbone network configuration is required.

Furthermore, because certain embodiments of the invention provide for a newly activated eNode-B to derive its own network configuration parameters from a set of pre-defined default parameters, in the scenario that the newly attached eNode-B does not sense any neighboring cells, the autonomous network configuration should be able to recover from a system failure, such as a power outage. This is because the newly activated eNode-B is still able to configure its network parameters, and to broadcast the network parameters in a Rel'9 message, over a Rel'8 BCH, despite the fact that the newly activated eNode-B does not sense any neighboring eNode-Bs, and does not receive any network configuration information from the neighboring eNode-Bs.

Furthermore, according to embodiments of the present invention, only basic eNode-B to eNode-B communication over the air, and setting of eNode-B parameters are involved. Thus, embodiments of the present invention are transparent to UEs, and implementation is therefore only related to eNode-Bs. Thus, embodiments of the present invention provide an advantage in that a framework is provided for easy automatic configuration of eNode-Bs, allowing support for uncoordinated deployment of eNode-Bs.

One having ordinary skill in the art would readily understand that the invention, as described above, may be utilized in time domain division duplexing (TDD) systems, where all eNode-Bs have the capability to both receive and transmit in the same frequency. Thus, new eNode-Bs being activated can easily listen for BCHs from existing eNode-Bs in a network.

One having ordinary skill in the art would also readily understand that the invention, as described above, may also be utilized in frequency division duplexing (FDD) systems. While new eNode-Bs would need to be configured with receiver capability in the same band normally used for transmission, implementation would be feasible, as new eNode-Bs would not start transmission during the phase when listening for a BCH from neighboring eNode-Bs.

One having ordinary skill in the art would also readily understand that while embodiments of the invention have been discussed in relation to 3GPP LTE Rel'8 and Rel'9, the invention could be applied, in other embodiments, towards other future 3GPP LTE releases, or other standards, such as WLAN, WiFi, Bluetooth, UTMS, GSM, etc. Thus, the discussed embodiments of the invention utilizing 3GPP LTE Rel'8 and Rel'9 are only an example to illustrate and clarify the present invention, and do not limit the spirit and scope of the invention in any way.

One having ordinary skill in the art would also readily understand that while embodiments of the invention have been discussed in relation to eNode-Bs, the invention could be applied, in other embodiments, towards any type of base station, such as a base station, a base transceiver station, a radio base station, a Node-B, etc. Furthermore, one having ordinary skill in the art would also readily understand that the invention could be applied, in other embodiments, towards any type of network element, other than a base station, capable of transmitting and receiving messages over a communication network, such as a WLAN router, etc. Thus, the discussed embodiments of the invention utilizing eNode-Bs are only an example to illustrate and clarify the present invention, and do not limit the spirit and scope if the invention in any way.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
listening over a broadcast channel for a first message from a first base station, at a second base station, the first message comprising network configuration information;
receiving the first message over the broadcast channel from the first base station;
configuring network parameters of the second base station based upon the received network configuration information; and
broadcasting a second message over the broadcast channel to a third base station operating on a same frequency as the second base station, the second message comprising the configured network parameters.

2. The method of claim 1, wherein the receiving the first message comprises receiving at least one of a cell identification, a list of internet protocol addresses of existing base stations, and a scrambling code assignment in the message.

3. The method of claim 1, wherein the first and second message each comprise a third generation partnership project long term evolution release 9 broadcast channel message or a subsequent third generation partnership long term evolution release broadcast channel message.

4. The method of claim 3, wherein the listening over the broadcast channel comprises listening over a third generation partnership project long term evolution release 8 broadcast channel.

5. The method of claim 4, wherein the receiving the first message over the broadcast channel comprises receiving the first message over the third generation partnership project long term evolution release 8 broadcast channel.

6. The method of claim 5, wherein the broadcasting the second message over the broadcast channel comprises broadcasting over the third generation partnership project long term evolution release 8 broadcast channel.

7. The method of claim 1, wherein the configuring network parameters of the second base station comprises deriving the network parameters of the second base station from the received network configuration information and from unique network parameters specific to the second base station.

8. The method of claim 7, wherein the unique network parameters comprise a media access control address for a network card.

9. The method of claim 1, wherein, if no first message is received, the configuring the network parameters of the second base station is solely based on default parameters.

10. A computer program, embodied on a computer readable medium, configured to control a processor to implement a method, the method comprising:

listening over a broadcast channel for a first message from a first base station, at a second base station, the first message comprising network configuration information;

receiving the first message over the broadcast channel from the first base station;

configuring network parameters of the second base station based upon the received network configuration information; and broadcasting a second message over the broadcast channel to a third base station operating on a same frequency as the second base station, the second message comprising the configured network parameters.

11. An apparatus, comprising:

a listener configured to listen over a broadcast channel for a first message from a first base station, the first message comprising network configuration information;

a receiver configured to receive the first message over the broadcast channel from the first base station;

a controller configured to configure network parameters of a second base station based upon the received network configuration information; and a transmitter configured to broadcast a second message over the broadcast channel to a third base station operating on a same frequency as the second base station, the second message comprising the configured network parameters.

12. The apparatus of claim 11, wherein the receiver is further configured to receive at least one of a cell identification, a list of internet protocol addresses of existing base stations, and a scrambling code assignment in the message.

13. The apparatus of claim 11, wherein the first and second message each comprise a third generation partnership project long term evolution release 9 broadcast channel message or a subsequent third generation partnership long term evolution release broadcast channel message.

14. The apparatus of claim 13, wherein the listener is further configured to listen over a third generation partnership project long term evolution release 8 broadcast channel.

15. The apparatus of claim 14, wherein the receiver is further configured to receive the first message over the third generation partnership project long term evolution release 8 broadcast channel.

16. The apparatus of claim 15, wherein the transmitter is further configured to broadcast over the third generation partnership project long term evolution release 8 broadcast channel.

17. The apparatus of claim 11, wherein the controller is further configured to derive the network parameters of the second base station from the received network configuration information and from unique network parameters specific to the second base station.

18. The apparatus of claim 17, wherein the unique network parameters comprise a media access control address for a network card.

19. The apparatus of claim 11, wherein the controller is further configured, if no first message is received, to configure the network parameters of the second base station solely based on default parameters.

20. An apparatus, comprising:

means for listening over a broadcast channel for a first message from a first base station, the first message comprising network configuration information;

means for receiving the first message over the broadcast channel from the first base station;

means for configuring network parameters of a second base station based upon the received network configuration information; and means for broadcasting a second message over the broadcast channel to a third base station operating on a same frequency as the second base station, the second message comprising the configured network parameters.

21. A system, comprising:

a first base station, comprising, a processor configured to create a first message comprising network configuration information, and a transmitter configured to broadcast the first message over a broadcast channel to a second base station; and a second base station, comprising, a listener configured to listen over a broadcast channel for the first message from the first base station, a receiver configured to receive receiving the first message over the broadcast channel from the first base station, a controller configured to configure network parameters of the second base station based upon the received network configuration information, and a transmitter configured to broadcast a second message over the broadcast channel to a third base station operating on a same frequency as the second base station, the second message comprising the configured network parameters.

* * * * *